US012791533B2

(12) United States Patent
Giesselmann et al.

(10) Patent No.: US 12,791,533 B2
(45) Date of Patent: Nov. 10, 2026

(54) CHROMATOGRAPHY METHOD AND DEVICE, IN PARTICULAR METHOD AND DEVICE FOR SUPERCRITICAL LIQUID CHROMATOGRAPHY

(71) Applicant: K.D. PHARMA BEXBACH GMBH, Bexbach (DE)

(72) Inventors: Gideon Giesselmann, Tawern (DE); Roberto Fronzoni, Homburg (DE); Elia Ramos-Tercero, Basel (CH); Denitsa Shopova-Gospodinova, Schönenberg-Kübelberg (DE); Bruno Calla, Sulzbach (DE)

(73) Assignee: K.D. PHARMA BEXBACH GMBH, Bexbach (DE)

( * ) Notice: Subject to any disclaimer, the term of this patent is extended or adjusted under 35 U.S.C. 154(b) by 365 days.

(21) Appl. No.: 18/557,853

(22) PCT Filed: Mar. 31, 2022

(86) PCT No.: PCT/EP2022/058552

§ 371 (c)(1),
(2) Date: Oct. 27, 2023

(87) PCT Pub. No.: WO2022/238046

PCT Pub. Date: Nov. 17, 2022

(65) Prior Publication Data

US 2024/0219356 A1 Jul. 4, 2024

(30) Foreign Application Priority Data

May 10, 2021 (LU) ........................................ 500141
Aug. 9, 2021 (LU) ........................................ 500521

(51) Int. Cl.
*G01N 30/44* (2006.01)
*G01N 30/02* (2006.01)

(52) U.S. Cl.
CPC ....... *G01N 30/44* (2013.01); *G01N 2030/027* (2013.01)

(58) Field of Classification Search
CPC ............ B01D 15/1814; B01D 15/1821; G01N 2030/027
See application file for complete search history.

(56) References Cited

U.S. PATENT DOCUMENTS 5,719,302 A 2/1998 Perrut
8,282,831 B2 10/2012 Kessler
(Continued)

FOREIGN PATENT DOCUMENTS

DE 69401506 T2 9/1997
EP 1982752 A1 10/2008
(Continued)

OTHER PUBLICATIONS

Yamada et al—JP 2015163607A merged original document and FIT translation—Sep. 10, 2015 (Year: 2015).*
(Continued)

*Primary Examiner* — Bradley R Spies
(74) *Attorney, Agent, or Firm* — LUCAS & MERCANTI, LLP; Klaus P. Stoffel

(57) ABSTRACT

A chromatography method in which a starting material is separated into fractions and at least one of the fractions which have at least a predetermined target content of at least one target component of the starting material is derived as a target product fraction. The fractions which do not have the predetermined target content form residual fractions and at least part of at least one of the residual fractions is added to the starting material still to be separated. At least part of at least one of the residual fractions of which the content of the target component differs less from the predetermined target content than the target component content of the starting
(Continued)

material is added to the starting material still to be separated. The residual fractions of which the target component content differs more from the predetermined target content than that of the starting material are diverted for further handling.

23 Claims, 2 Drawing Sheets

(56) References Cited

U.S. PATENT DOCUMENTS

| | | | |
|---|---|---|---|
| 2018/0231510 A1 | 8/2018 | Yamazaki | |
| 2018/0339244 A1 | 11/2018 | Hubbuch | |
| 2020/0001203 A1 | 1/2020 | Sichting | |
| 2020/0255389 A1 * | 8/2020 | Tegen .................. | C07D 311/86 |

FOREIGN PATENT DOCUMENTS

| | | | | |
|---|---|---|---|---|
| EP | 3173782 | A1 | | 5/2017 |
| EP | 3730511 | A1 | | 10/2020 |
| JP | H06118073 | A | | 4/1994 |
| JP | 2015163607 | A | * | 9/2015 |
| TW | 201311329 | A | | 3/2013 |

OTHER PUBLICATIONS

International Search Report (PCT/EP2022/058552) Dated Jul. 15, 2022, 3 Pages.

Sylvia Feil. “Fettsäuren geben Signal für Ri.ickzug von Entzündung” Chemie in Unserer Zeit, Verlag Chemie, Weinheim, DE, vol. 48, No. 4, Aug. 5, 2014 (Aug. 5, 2014), p. 244 DOI: 10.1002/CIUZ. 201490045 ISSN: 0009-2851, XP071178688.

Keszler L C et al. “Improving performance of simulated moving bed chromatography by fractionation and feed-back of outlet streams” Journal of Chromatography A, Elsevier, Amsterdam, NL, vol. 1207, No. 1-2, Oct. 17, 2008 (Oct. 17, 2008), pp. 55-71, [retrieved on Aug. 13, 2008] DOI: 10.1016/J.CHROMA.2008.08.022 ISSN: 0021-9673, XP025473780.

“Role of recycling in improving the performance of chromatographic solvent gradient purifications”, Abhijit Tarafder, Guido Strohlein, Lars Aumann, Massimo Morbidelli, Available online Jan. 17, 2008, 13 pages.

* cited by examiner

CHROMATOGRAPHY METHOD AND DEVICE, IN PARTICULAR METHOD AND DEVICE FOR SUPERCRITICAL LIQUID CHROMATOGRAPHY

CROSS-REFERENCE TO RELATED APPLICATIONS

The present application is a 371 of International application PCT/EP2022/058552, filed Mar. 31, 2022, which claims priority of LU LU500141, filed May 10, 2021, and LU LU500521, filed Aug. 9, 2021, the priority of these applications is hereby claimed and the applications are incorporated herein by reference.

BACKGROUND OF THE INVENTION

The invention relates to a chromatography method, especially to methods of supercritical liquid chromatography in which a starting material to be separated is separated into fractions by supercritical liquid chromatography, and at least one of the fractions having at least a defined target content of at least one target component of the starting material is diverted off as target product fraction.

The invention further relates to an apparatus for supercritical liquid chromatography.

Chromatography methods of the abovementioned type are known through use. A substance mixture to be separated is passed through the chromatography column having a stationary phase that comprises, for example, what is called a packing of porous material. The various substances in the substance mixture are subject to different retentions as they flow through the stationary phase, meaning that they flow through the stationary phase at different speeds owing to different strengths of interaction in the stationary phase. This enables the separation.

The uses of methods of conducting supercritical liquid chromatography (SFC) include separation of polyunsaturated fatty acids from fatty acid mixtures.

SUMMARY OF THE INVENTION

It is an object of the invention to provide a method of the type specified at the outset that gives a higher yield.

This object is achieved in accordance with the invention in that the fractions that do not have the defined target content form residual fractions and at least a portion of at least one of the residual fractions is added to the starting material yet to be separated.

Advantageously, the residual fractions or at least portions thereof are recycled in the separation process. The possibility of subjecting a substance repeatedly to the separation process in a single chromatography apparatus is provided. It is advantageously possible to increase the yield of a target product.

In a particularly preferred configuration of the invention, at least a portion of at least one of the residual fractions wherein the content of the target component varies to a lesser degree from the defined target content than the target component content of the starting material is added to the starting material yet to be separated. It will be apparent that the residual fractions having the latter target component content may optionally be added completely to the starting material yet to be separated. Appropriately, the only residual fractions added to the starting material yet to be separated are those wherein the content of the target component varies to a lesser degree from the defined target content than the target component content of the starting material, or at least portions thereof.

The portion of the residual fractions wherein the target component content varies to a lesser degree from the defined target content than the target component content of the starting material is recycled directly within the method of the invention in that it is fed to the starting material which is intended for separation. As a result, the content of the target component in the separation material to be processed by chromatography is firstly brought closer to the target content, such that it is possible to achieve a greater yield of the target product. Secondly, the target component present in the residual fraction to be recycled can be fed to the target product fraction.

Appropriately, the residual fractions wherein the target component content varies to a greater degree from the defined target content than that of the starting material are diverted off for further handling, especially further processing or/and disposal.

In one embodiment of the invention, the defined target content is a minimum content or/and a maximum content. The defined target content is typically a minimum content when the content of the respective component in the target product is to be increased compared to the starting material. The defined target content is typically a maximum content when the content of the respective component in the target product is to be reduced compared to the starting material.

Appropriately, if the target content is a minimum content, the only residual fractions fed to the starting material yet to be separated are those wherein the target component content is greater than that of the starting material.

Preferably, the residual fractions wherein the target component content is less than that of the starting material are diverted off for further handling, especially for further processing or/and disposal.

Conversely, in an appropriate manner, if the target content is a maximum content, all that are fed to the starting material yet to be separated are the residual fractions wherein the target component content is lower than that of the starting material.

Preferably, in that case, the residual fractions wherein the target component content is greater than that of the starting material are diverted off for further handling, especially for further processing or/and disposal.

In a further embodiment of the invention, a content of at least two, and optionally more than two, different target components in the starting material and in the fractions is determined and the different target component contents of the residual fractions are preferably compared with those of the starting material. It is advantageously possible to take account of the contents of multiple components. In particular, for target components, it is possible to consider minimum contents for individual components and maximum contents for others.

In one configuration of the invention, the contents of the target component are determined in the starting material and in the fractions, preferably by means of a suitable measurement device, preferably with continuous determination of the target component content.

Appropriately, the target component content of the residual fractions is compared with that of the starting material. Using results from the comparisons, a decision is made as to whether the fractions are treated as target product fractions or residual fractions, and in particular whether the residual fractions are added to the starting material or diverted off for further handling.

It may be the case that at least individual residual fractions or all residual fractions are mixed with one another and the target component content of the mixture of residual fractions is determined. Using the target component content of the residual fraction mixture, a decision is made as to whether the residual fraction mixture is added to the starting material or diverted off for further handling.

In the preferred embodiment of the invention, at least the determination and the comparisons of the target component contents and feeding of the residual fraction to the starting material to be separated are conducted automatically. The determination of the target component content is used to see how the respective fractions should be handled. If the determination of the target component content shows that the respective fraction has such a target component content that it can be used as target product fraction, the respective fraction is appropriately diverted off automatically as target product. If the fraction has a different target component content, the respective fraction is preferably automatically fed to the starting material or disposed of.

In a further embodiment of the invention, the residual fraction is fed to the starting material yet to be separated before separation thereof by chromatography. For this purpose, a vessel is preferably provided, in which the residual fraction is added to the starting material. Appropriately, the starting material and the residual fraction are mixed before the separation.

In one configuration of the invention, the flow of the residual fraction which is fed to the starting material yet to be separated before separation thereof is adjusted, preferably under closed-loop control, depending on the content of the target component in the starting material and/or in the target product fraction.

The chromatography method of the invention is found to be particularly advantageous for performance of methods of supercritical liquid chromatography. It can also be employed advantageously for liquid chromatography, especially for thin-film chromatography or column chromatography, especially low-pressure liquid chromatography, high-performance liquid chromatography (HPLC), gel-permeation chromatography (GPC) or ion-exchange chromatography (IC), or field-flow fractionation (FFF).

The chromatography method of the invention can be performed by what is called the batchwise method. The separation is then appropriately effected stepwise. In particular, in a first separation step, a separation into two or more fractions is conducted, and the fractions are handled as described above. A next step is optionally effected with separation of the starting material together with a residual fraction or a portion thereof.

However, the method of the invention can also be employed in chromatography methods that are performed continuously. Such chromatography methods, in which two or more of the chromatography columns are connected to one another, are, for example, true moving bed (TMB) chromatography and simulated moving bed (SMB) chromatography.

In SMB chromatography, two or more of the chromatography columns are connected to one another in series. At different connection sites between the chromatography columns, the substance mixture and an eluent are introduced. Likewise at other connection sites, a raffinate and an extract are withdrawn, where the raffinate withdrawn is the substance or, if appropriate, the substances that are subject to lower retention in the chromatography, and the extract withdrawn is the substance or substances that are subject to greater retention in the chromatography. Consequently, the substance mixtures can be separated by the known chromatography methods, according to the handling of the chromatography, into two different substance submixtures, where a first substance submixture contains substances that are subject to lower retention, and a second substance submixture contains substances that are subject to greater retention.

Appropriately, the method is conducted continuously. A particularly suitable method for continuous performance of the method has been found to be the simulated moving bed (SMB) method.

Suitable starting materials for processing by means of the method of the invention are those that are soluble in an eluent for chromatography methods.

For supercritical liquid chromatography in particular, the starting material may be at least one substance or a mixture of substances that is/are soluble in supercritical $CO_2$ or in a mixture of supercritical $CO_2$ and at least one additional solvent, e.g. methanol or/and ethanol.

The method has been found to be particularly advantageous when the starting material is or comprises a mixture of fatty acids and/or derivatives thereof, preferably a mixture of unsaturated, especially polyunsaturated, fatty acids or/and derivatives thereof. The target component may then be one of the polyunsaturated fatty acids and/or derivatives thereof.

The target component is more preferably eicosapentaenoic acid (EPA) and/or docosahexaenoic acid (DHA).

Appropriately, the minimum target component content of EPA is 900 mg/g, preferably 970 mg/g.

The minimum target component content of DHA is appropriately 850 mg/g, preferably 900 mg/g.

The starting material may further be or comprise a mixture of carboxylic acids and/or derivatives thereof, preferably a mixture of cannabinoids and/or cannabinoid derivatives. The target component is preferably cannabidiol, preferably CBD, or tetrahydrocannabinol (THC) or derivatives, especially acids, thereof, preferably CBD/A, THC/A, CBG/A, CBN/A or/and CBC/A.

In one embodiment of the invention, the starting material is or comprises a mixture comprising at least one metabolite of a polyunsaturated fatty acid, preferably of eicosapentaenoic acid (EPA) and/or of docosahexaenoic acid (DHA) and/or of docosapentaenoic acid (DPA), or comprises a substance having the same composition as the metabolite.

Appropriately, the target component is a metabolite of a polyunsaturated fatty acid, preferably of eicosapentaenoic acid (EPA) and/or of docosahexaenoic acid (DHA) and/or of docosapentaenoic acid (DPA), or is a substance having the same composition as the metabolite.

In a further configuration of the invention, the starting material is or comprises a mixture containing at least one pre-resolving mediator (PRM) and/or a specialized pre-resolving mediator (SPM), preferably derived from EPA, DHA or/and from DPA.

Appropriately, the target component is at least one pre-resolving mediator (PRM) and/or a specialized pre-resolving mediator (SPM), preferably derived from EPA, DHA or/and from DPA, is separated from substance mixture.

In a further configuration of the invention, the starting material is or comprises a mixture of pre-resolving mediators (PRM), preferably 18-HEPE, 17-HDHA and/or 14-HDHA, and/or of specialized pre-resolving mediators (SPM), preferably lipoxins, resolvins, protectins and/or maresins.

Appropriately, the target component is at least one pre-resolving mediator (PRM), preferably 18-HEPE, 17-HDHA and/or 14-HDHA, and/or a specialized pre-resolving mediator (SPM), preferably lipoxin, resolvin, protectin and/or maresin.

The pre-resolving mediator (PRM) is preferably at least one substance from the group of substances 18-HEPE, 17-HDHA and 14-HDHA.

The specialized pre-resolving mediator (SPM) is preferably at least one substance from the group of substances lipoxin, resolvin, protectin and maresin.

The lipoxin is preferably at least one substance from the group of substances LxA4 (5S,6R,15S-trihydroxy-7E,9E,11Z,13E-ETE), LxB4 (5S,14R,15S-trihydroxy-6E,8Z,10E,12E-ETE), 15-epi-LxA4 (5S,6R,15R-trihydroxy-7E,9E,11Z,13E-eicosatetraenoic acid), 15-epi-LxB4 (5S,14R,15R-trihydroxy-6E,8Z,10E,12E-eicosatrienoic acid).

The resolvin is appropriately derived from EPA, DHA or/and from DPA. The resolvin is preferably at least one substance from the group of substances RvE1 (5S,12R,18R-trihydroxy-6Z,8E,10E,14Z,16E-EPA), 18S-RvE1 (5S,12R,18S-trihydroxy-6Z,8E,10E,14Z,16E-EPA), RvE2 (5S,18R-dihydroxy-6E,8Z,11Z,14Z,16E-EPA), RvE3 (17R,18R/S-dihydroxy-5Z,8Z,11Z,13E,15E-EPA), and/or one substance from the group of substances RvD1 (7S,8R,17S-trihydroxy-4Z,9E,11E,13Z,15E,19Z-DHA), RvD2 (7S,16R,17S-trihydroxy-4Z,8E,10Z,12E,14E,19Z-DHA), RvD3 (4S,11R,17S-trihydroxy-5Z,7E,9E,13Z,15E,19Z-DHA), RvD4 (4S,5R,17S-trihydroxy-6E,8E,10Z,13Z,15E,19Z-DHA), RvD5 (7S,17S-dihydroxy-4Z,8E,10Z,13Z,15E,19Z-DHA), RvD6 (4S,17S-dihydroxy-5E,7Z,10Z,13Z,15E,19Z-DHA), and/or one substance from the group of substances RvT1 (7,13R,20-trihydroxy-8E,10Z,14E,16Z,18E-DPA), RvT2 (7,8,13R-trihydroxy-9E,11E,14E,16Z,19Z-DPA), RvT3 (7,12,13R-trihydroxy-8Z,10E,14E,16Z,19Z-DPA), RvT4 (7,13R-dihydroxy-8E,10Z,14E,16Z,19Z-DPA).

The protectin is appropriately derived from DHA or/and from DPA.

The protectin is preferably at least one substance from the group of substances PD1 or NPD1 (10R,17S-dihydroxy-4Z,7Z,11E,13E,15Z,19Z-DHA), PDX (10S,17S-dihydroxy-4Z,7Z,11E,13Z,15E,19Z-DHA), 22-hydroxy-PD1 (10R,17S,22-trihydroxy-4Z,7Z,11E,13E,15Z,19Z-DHA), 17-epi-PD1 or AT-PD1 (10R,17R-dihydroxy-4Z,7Z,11E,13E,15Z,19Z-DHA), 10-epi-PD1 or ent-AT-NPD1 (10S,17S-dihydroxy-4Z,7Z,11E,13E,15Z,19Z-DHA) and/or one substance from the group of substances PD1n-3 (10,17-dihydroxy-7,11,13,15,19-DPA), PD2n-3 (16,17-dihydroxy-7,10,12,14,19-DPA).

The maresin is appropriately derived from DHA or/and from DPA. The maresin is preferably at least one substance from the group of substances MaR1 (7R,14S-dihydroxy-4Z,8E,10E,12Z,16Z,19Z-DHA), MaR2 (13R,14S-dihydroxy-4Z,7Z,9E,11E,16Z,19Z-DHA), 7-epi-MaR1 (7S,14S-dihydroxy-4Z,8E,10Z,12E,16Z,19Z-DHA), MaR-L1 (14S,22-dihydroxy-4Z,7Z,10Z,12E,16Z,19Z-DHA), MaR-L2 (14R,22-dihydroxy-4Z,7Z,10Z,12E,16Z,19Z-DHA), and/or one substance from the group of substances MaR1n-3 (7S,14S-dihydroxy-8E,10E,12Z,16Z,19Z-DPA), MaR2n-3 (13,14-dihydroxy-7,9,111,16,19-DPA), MaR3n-3 (13,14-dihydroxy-7,9,111,16,19-DPA).

The eluent used for supercritical liquid chromatography (SFC) is preferably supercritical carbon dioxide, propane, N-pentane, trifluoromethanomaxenone, water or ammonia. The eluent may include a solvent as cosolvent, preferably ethanol, methanol, isopropanol, acetonitrile, tetrahydrofuran, dichloromethane, chloroform, ethyl acetate and/or trifluoroacetic acid.

Appropriately, a chromatography eluent, after the separation has been performed, is reused for performance of chromatography, as known per se from the prior art, for example for supercritical liquid chromatography (SFC). For this purpose, after being separated off after performance of liquid chromatography, it is preferably directed into an eluent reservoir from which the eluent is fed for performance of liquid chromatography.

The apparatus specified at the outset comprises a typical construction of a chromatography apparatus which is known per se, especially of an apparatus for supercritical liquid chromatography. In particular, the apparatus comprises a separating column, a separation material reservoir, an eluent reservoir, and a device for removing the fractions mentioned. The separation material reservoir and the eluent reservoir are connected to the separating column such that the respective separation material and the eluent can be fed to the separating column in a controlled manner, preferably by open-loop and/or closed-loop control. The fraction removal device is connected to the separating column in such a way that the respective fractions can be removed from the separating column, in particular under closed-loop and/or open-loop control. The fraction removal device is also connected to the separating column in such a way that the eluent or the eluent mixture can be fed back into the eluent reservoir after performance of the separation. For removal of the different fractions, it is preferably provided with multiple fractionation columns into which the respective fractions can be directed. The separation material reservoir is preferably connected to a starting material reservoir and is preferably fed continuously with the starting material. Appropriately, the separation material reservoir is also set up to feed in the residual material fractions wherein the target component content is greater than that of the starting material. For this purpose, a conduit between the fraction removal device and the separation material reservoir may be provided, by means of which the respective residual material fraction can be fed to the separation material reservoir.

In a particularly preferred embodiment of the invention, the fraction removal device is set up to pass the target product fraction and the residual fractions onward differently, especially depending on the respective target component content. Appropriately, the fraction removal device for this purpose has multiple conduits provided with valves, via which the fractions can electively be passed onward. The target product fractions are preferably directed into a target product vessel provided for the purpose. The suitable residual fractions are directed into the separation material vessel. The other residual material fractions are directed into a vessel for further handling.

The apparatus appropriately comprises a device for measuring the target component content in the starting material and a device for measuring the target component content in the fractions. In addition, a device may be provided for measurement of the target component content in the separation material present in the separation vessel in which the residual fraction is added to the starting material.

In one configuration of the invention, the apparatus is provided such that the fraction removal device passes the fractions onward appropriately depending on measurement results by means of the measurement devices. For this purpose, the apparatus may be provided with a closed-loop and/or open-loop control device that reads out the measurement values, evaluates them and, according to the respective evaluation results, controls the fraction removal device, especially by handling the valves, so as to effect the intended onward conduction of material.

BRIEF DESCRIPTION OF THE DRAWING

The invention is elucidated in detail hereinafter with reference to working examples and the appended drawings that relate to the working examples. The figures show.

DETAILED DESCRIPTION OF THE INVENTION

A. Apparatus According To Figs. 1 And 2

Figure 1:
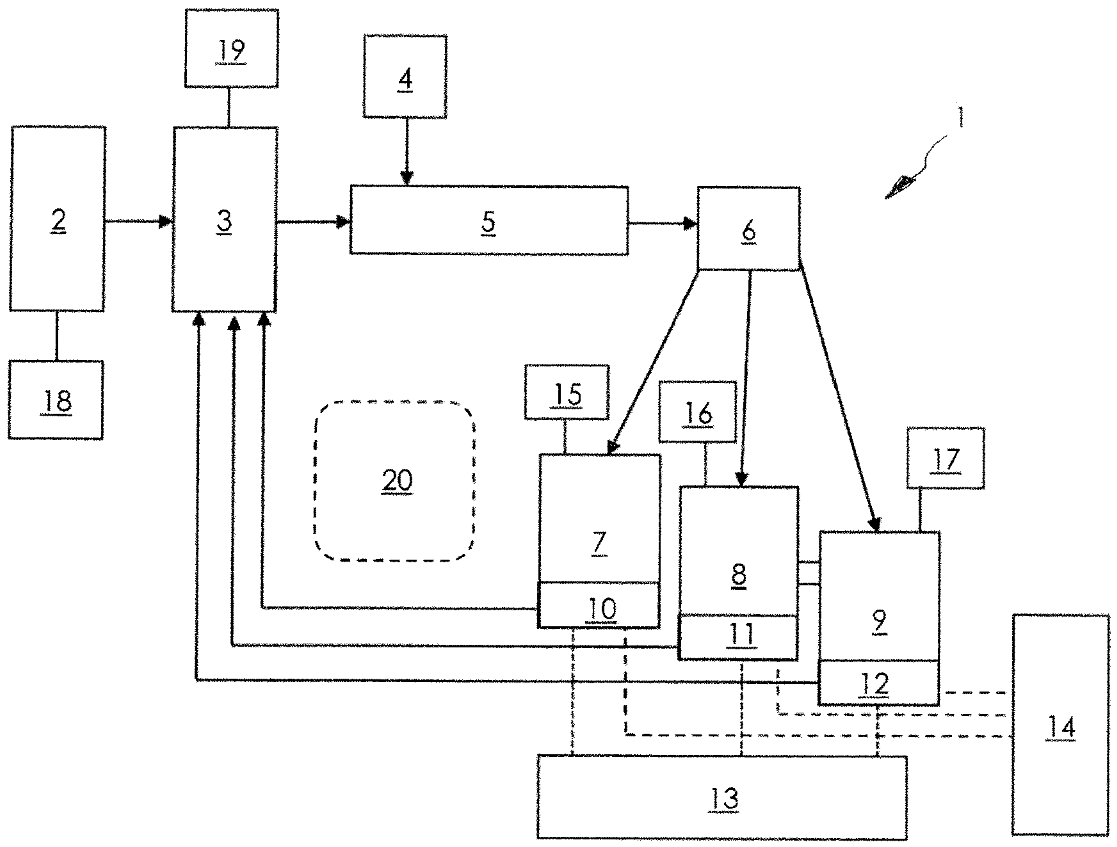
FIG. 1 a schematic of an apparatus of the invention.

FIG. 1 shows a schematic of an inventive apparatus 1 for supercritical liquid chromatography. The apparatus 1 has the components, known per se, of an SFC apparatus as described, for example, in DE 199 34 168 A1. In particular, it comprises a separating column 5 which is charged with a starting material from a starting material reservoir 2 and an eluent from an eluent reservoir 4.

Fractions generated in the separation by means of separating column 5 are directed by means of a fractionation device 6 into fractionation columns 7, 8, 9. Each of the fractionation columns 7, 8, 9 is connected via conduits to a target product vessel 13, a residual material vessel 14 and a separation material vessel 3. In addition, each of the fractionation columns 7, 8, 9 has a switchable valve device 10, 11, 12, by means of which it is possible to establish the vessel into which the fractions that have been obtained in the respective fractionation columns 7, 8, 9 are directed. Consequently, by means of the switchable valve devices 10, 11, 12, it is possible to direct the respective fractions from the fractionation columns 7, 8, 9 electively into any of the vessels 3, 13, 14.

The separation material vessel 3 is fed with the starting material from the starting material reservoir 2. The material to be separated in the separating column 4 is fed out of the separation material reservoir 3.

The starting material reservoir 2 and the fractionation columns 7, 8, 9 and optionally the separation material vessel 3 are each provided with a measurement device 15, 16, 17, 18, 19, which is intended to determine the content of at least one component of a material in the respective container.

Figure 2:
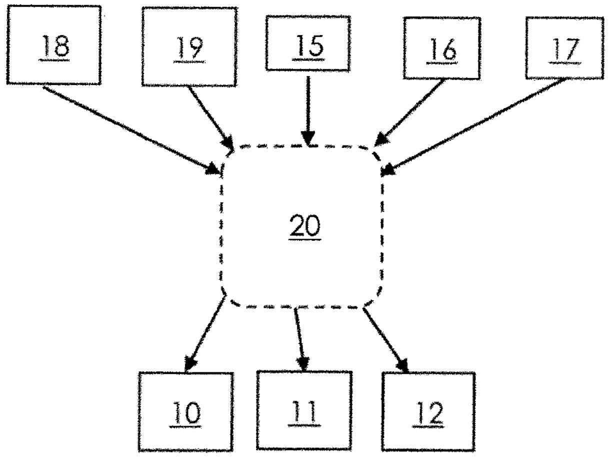
FIG. 2 a schematic of a portion of an apparatus of the invention according to FIG. 1, and FIG. 3 a schematic of a further apparatus of the invention

The apparatus 1 comprises a closed-loop control system 20 which, as shown schematically in FIG. 2, is set up to receive measurement data from the measurement device 15, 16, 17, 18, 19, and to use the measurement data to set the switchable valve devices 10, 11, 12.

In the case of performance of supercritical liquid chromatography, the separation vessel 3 is fed with starting material from the starting material reservoir 2, and the material from the separation vessel is separated in the separating column 5 by feeding in the eluent 4. The different fractions created are separated into the fractionation columns 7, 8, 9 by means of the fractionation device 6, and the content of a target product in the fractions is measured in the respective fractionation columns 7, 8, 9 by means of the measurement devices 15, 16, 17. In addition, the content of the target product is measured in the starting material reservoir 2 and optionally in the separation vessel 3 by means of the measurement devices 18, 19.

Conditions recorded in the closed-loop control system 20 are used as a reference for the setting of the valves of the valve devices 10, 11, 12.

A first condition is a minimum target product content. In the case of fractions having the defined minimum target product content according to the respective measurement, the valves are switched such that these fractions are directed into the target product vessel 13.

A further condition is that the target product content is less than the minimum target product content but greater than the target product content of the starting material, which is measured by means of measurement device 18. If a fraction from one of the fractionation columns 7, 8, 9 meets this condition, the fraction is fed into the separation vessel 3 and separated in the separating column 5 together with the as yet unprocessed starting material.

If one of the fractions from one of fractionation columns 7, 8, 9 meets none of the latter conditions, it is directed into the residual material vessel 14.

Example 1

In the above-described apparatus 1, starting material processed is an oil having 20% by weight of EPA and 70% by weight of DHA. This may be an oil that has been produced from fish oil or algae oil.

The aim of the processing by means of apparatus 1 is to obtain an oil having a DHA content of at least 90% by weight.

The oil to be processed is in the starting material reservoir 2.

The eluent provided in the eluent reservoir 4 is a mixture of $CO_2$ with ethanol as cosolvent. After performance of the supercritical liquid chromatography, a fraction is formed in the fractionation column 7 that includes 68% by weight of DHA, a fraction is formed in the fractionation column 8 that includes 83% by weight of DHA, and a fraction is formed in the fractionation column 9 that contains 93% by weight of DHA.

In accordance with the measurement results, the valve devices 10, 11, 12 are set such that fraction from the fractionation column 7 that has a lower content of DHA than the starting material is directed into the residual material vessel 14. The valve device 11 is set such that the fraction from the fractionation column 8 which, at 83% by weight of DHA, has a smaller content than the target product content but a greater content than the content in the starting material is directed into the separation material vessel. The fraction from the fractionation column 9, at 93% by weight of DHA, has a DHA content greater than the minimum target product content of 90% by weight of DHA and is therefore directed into the target product vessel 3.

Example 2

Starting data as described above for example 1.

However, the fractions from the fractionation columns that do not meet the minimum target product content of 90% by weight of DHA are mixed with one another to give a residual material mixture, and the DHA content of the mixture is measured. If the residual material mixture has a DHA content greater than that of the starting material, it is introduced into the separation material vessel 3, where it is mixed with the starting material. If the DHA content of the residual material mixture is less than that of the starting material, it is directed into the residual material vessel 14.

Example 3

The above-described apparatus 1 is processed an oil as starting material, which has 20% by weight of EPA, 70% by weight of DHA and 4% by weight of arachidonic acid (ARA). This may be an oil which has been produced from fish oil or algae oil.

The aim of the processing by means of apparatus 1 is to obtain an oil having a DHA content of at least 90% by weight and an ARA content <0.5%.

The oil to be processed is present in the starting material reservoir 2.

The eluent provided in the eluent reservoir 4 is a mixture of $CO_2$ with ethanol as cosolvent. After performance of the supercritical liquid chromatography, a fraction is formed in the fractionation column 7 that includes 66% by weight of DHA and 3.8% by weight of ARA, a fraction is formed in the fractionation column 8 that includes 83% by weight of DHA and 1.7% by weight of ARA, and a fraction is formed in the fractionation column 9 that contains 93% by weight of DHA and 0.3% by weight of ARA.

In accordance with the measurement results, the valve devices 10, 11, 12 are set such that fraction from the fractionation column 7 that has a lower content of DHA and a greater content of ARA than the starting material is directed into the residual material vessel 14. The valve device 11 is set such that the fraction from the fractionation column 8 which, at 83% by weight of DHA, has a smaller content for DHA than the target product content but a greater content than the content in the starting material and, at and 1.7% by weight of ARA, has a greater content for ARA than the target product content but a smaller content than the content in the starting material is directed into the separation material vessel. The fraction from the fractionation column 9, at 93% by weight of DHA, has a DHA content greater than the minimum DHA target product content of 90% by weight of DHA, and at 0.3% by weight of ARA, has an ARA content less than the maximum ARA target product content, and is therefore directed into the target product vessel 3.

Example 4

In the above-described apparatus 1, the starting material provided in the starting material reservoir is an oil including 72% by weight of EPA, 12% by weight of DHA and 16% by weight of SDA. This may be an oil that has been produced from fish oil or algae oil.

The eluent used, which is provided in the eluent reservoir 4, is a mixture of $CO_2$ with ethanol as cosolvent. Contents of EPA, DHA and SDA are determined by means of the measurement device 15, 16, 17, 18, 19, and settings are accordingly as elucidated above.

The aim of the processing by means of apparatus 1 is to obtain an oil having an EPA content of at least 96% by weight. A fraction with such an EPA content is introduced into target product vessel 13.

Additionally directed into the separation material vessel 3 are fractions having ≤96% by weight of EPA but ≥75% by weight of EPA, <3% by weight of DHA and <6% by weight of SDA.

Fractions having none of the aforementioned contents are introduced into the residual material vessel 14.

Example 5

The above-described apparatus 1 is processed an oil as starting material, which includes 70% by weight of CBD. This may be an extract that has been produced from hemp.

The aim of the processing by means of apparatus 1 is to obtain an oil having a CBD content of at least 90% by weight.

The oil to be processed is present in the starting material reservoir 2.

The eluent provided in the eluent reservoir 4 is a mixture of $CO_2$ with ethanol as cosolvent. After performance of the supercritical liquid chromatography, a fraction is formed in the fractionation column 7 that includes 63% by weight of CBD, a fraction is formed in the fractionation column 8 that includes 87% by weight of CBD, and a fraction is formed in the fractionation column 9 that contains 95% by weight of CBD.

In accordance with the measurement results, the valve devices 10, 11, 12 are set such that fraction from the fractionation column 7 that has a lower content of CBD than the starting material is directed into the residual material vessel 14. The valve device 11 is set such that the fraction from the fractionation column 8 which, at 87% by weight of CBD, has a smaller content than the target product content but a greater content than the content in the starting material is directed into the separation material vessel. The fraction from the fractionation column 9, at 95% by weight of CBD, has a CBD content greater than the minimum target product content of 90% by weight of CBD and is therefore directed into the target product vessel 3.

B. Apparatus According To Fig. 3

Figure 3:
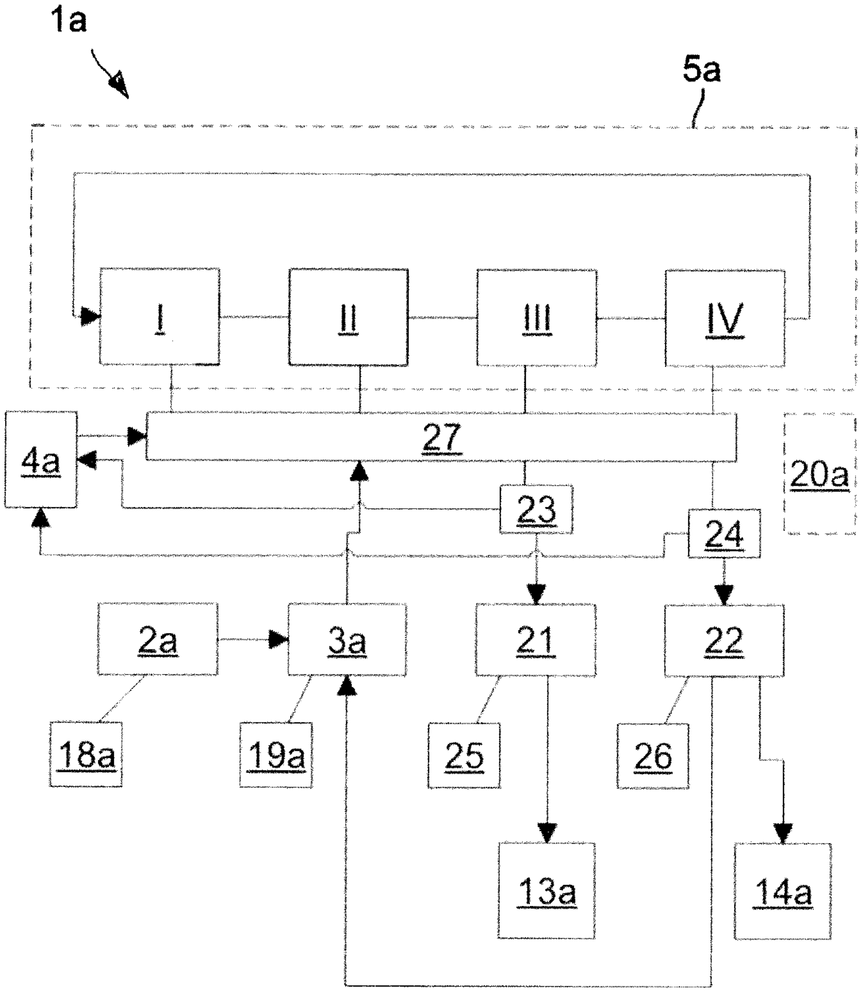

FIG. 3 shows a schematic of a further inventive apparatus 1*a*. For separation of a substance mixture, the apparatus 1*a* has a chromatography device 5*a* suitable for performance of simulated moving bed (SMB) chromatography. The chromatography device 5*a* has two or more separating columns connected to one another that collectively form zones I, II, III, IV. As known per se for SMB methods, the chromatography device 5*a* is supplied at varying points with the substance mixture to be separated and an eluent, and a raffinate and an extract are likewise withdrawn at varying points.

For this purpose, a directing device 27 is provided, comprising suitable conduits and valves and optionally connections, and a device for setting the valves. The directing device 27 may also have at least one pump, preferably two or more pumps, in order to provide the possibility of acting on material flows in the conduits.

In order to feed the chromatography device 5*a* with the substance mixture to be separated, the apparatus 1*a* has a separation material vessel 3*a* connected to a starting material reservoir 2*a* in which the starting material to be separated is disposed. Raffinate removed by means of the chromatography device 5*a* is directed into a raffinate vessel 21, and removed extract into an extract vessel 22. Before the raffinate and the extract are directed into the respective vessels 21, 22, the eluent may be separated respectively from the raffinate and from the extract, especially by evaporation, in separation devices 23, 24. The separation devices 23, 24 may be formed, for example, by a falling-film evaporator. The eluent from the separation devices 23, 24 may be recycled into an eluent reservoir.

Depending on the target product content(s), the raffinate is directed into a target product vessel 13*a* or, for the purpose of recycling, into the separation material vessel 3*a*. The extract, likewise depending on the target product content, is introduced into the separation material vessel 3*a* or into a residual material vessel 14*a*.

The substance mixture from the separation material vessel 3*a*, formed by a mixture of the starting material fed in via the starting material reservoir 2*a* and optionally of raffinate and/or extract, is then introduced the chromatography device 5*a*. There is continuous separation of material therein.

As FIG. 3 shows, the chromatography device 5*a* is connected via the directing device 27 to the raffinate vessel 21, the extract vessel 22, the residual material vessel 14*a* and the separation material vessel 3*a*.

As can be inferred from FIG. 3, a measurement device 19*a* is provided for the separation material vessel 3*a*, a measurement device 25 for the raffinate vessel 21, and a measurement device 26 for the extract vessel, by means of which the target product content(s) of the substances disposed in each can be measured. In addition, the starting material reservoir 2*a* may be provided with a measurement device 18*a* for determination of the product content or target product contents.

In an analogous manner to that elucidated above with reference to FIGS. 1 and 2, the apparatus 1*a* may have a closed-loop and/or open-loop control device 20*a* which takes account of the measurement values ascertained by the measurement devices 19*a*, 25, 26 and optionally 18*a* to establish how the substance mixture is formed in separation material vessel 3*a* by mixing the starting material, the raffinate and the extract, and/or how much of the substance mixture is fed to the chromatography device 5*a*. It will be apparent that the closed-loop and/or open-loop control device 20*a* is set up such that it can adjust the directing device 27, especially the valves and any pumps thereof.

Example 6

In the above-described apparatus 1, the starting material processed is an oil having 60% by weight of EPA, 15% by weight of DHA and 10% by weight of ARA. This may be an oil that has been produced from fish oil or algae oil. The aim of processing by means apparatus 1 is to obtain an oil having a DHA content of at least 90% by weight.

The oil to be processed is present in the starting material reservoir 2.

The eluent used, which is provided in the eluent reservoir 4, is ethanol.

In the course of continuous substance separation by means of the chromatography device 5*a* by the SMB method, the raffinate removed is a substance mixture having an EPA content that varies between 86% by weight and 97.5% by weight.

The closed-loop and/or open-loop control device 20*a* is programmed such that the raffinate is directed into the target product vessel 13*a* when the EPA content is >90% by weight, and into the separation material vessel when the EPA content is <90% by weight.

In addition, the closed-loop and/or open-loop control device 20*a* is programmed such that the extract is directed into the separation material vessel when the EPA content is >70% by weight and the ARA content is <10% by weight, and is otherwise directed into the residual material vessel 14*a*.

The closed-loop and/or open-loop control device 20*a* may also be provided such that the amount of molar amounts respectively introduced into the separation material vessel 3*a* from the starting material reservoir 2*a*, the raffinate vessel 21 and the extract vessel are adjusted such that the respective contents of EPA, DHA and ARA are within a certain defined range.

The invention claimed is:

1. A chromatography method, comprising the steps of: separating a starting material to be separated into fractions by chromatography in a separating column; diverting off at least one of the fractions having at least a defined target content of at least one target component from the starting material as a target product fraction, wherein the fractions that do not have the defined target content form residual fractions; and adding at least a portion of at least one of the residual fractions to the starting material yet to be separated, wherein the portion of the at least one of the residual fractions is added to the starting material in a separation material reservoir and the material to be separated in the separating column is fed out of the separation material reservoir.

2. The method according to claim 1, including adding at least a portion of at least one of the residual fractions, whose content of the target component varies to a lesser degree from the defined target content than the target component content of the starting material, to the starting material yet to be separated.

3. The method according to claim 1, including diverging off the residual fractions whose target component content varies to a greater degree from the defined target content than that in the starting material for further handling.

4. The method according to claim 3, wherein the defined target content is a minimum content and/or a maximum content.

5. The method according to claim 3, including determining a content of the target component in the starting material and in the fractions, and comparing the target component contents of the residual fractions with those of the starting material.

6. The method according to claim 5, including determining a content of at least two different target components in the starting material and in the fractions and comparing the different target component contents of the residual fractions with those of the starting material.

7. The method according to claim 1, including carrying out the method steps continuously.

8. The method according to claim 5, including automatically carrying out at least the determining and the comparing of the target component contents and a feeding of the residual fraction to the starting material to be separated.

9. The method according to claim 1, including feeding the residual fraction to the starting material to be separated before separation thereof by chromatography, the starting material and the residual fraction being mixed before the separation.

10. The method according to claim 9, including controlling a flow rate of the residual fraction which is fed to the starting material to be separated before separation thereof as a function of the content of the target component in the starting material and/or in the target product fraction.

11. The method according to claim 1, wherein the starting material comprises a mixture of fatty acids and/or derivatives thereof, and/or a mixture of carboxylic acids and/or derivatives thereof, and/or a mixture containing a metabolite of a polyunsaturated fatty acid, or a substance having the same composition as the metabolite, and/or a mixture containing at least one pre-resolving mediator and/or a specialized pre-resolving mediator, and/or a mixture containing at least one pre-resolving mediator and/or specialized pre-resolving mediator.

12. The method according to claim 11, wherein the mixture of fatty acids and/or derivatives thereof is a mixture of unsaturated fatty acids and/or derivatives thereof.

13. The method according to claim 12, wherein the mixture of fatty acids and/or derivatives thereof is a mixture of polyunsaturated fatty acids and/or derivatives thereof.

14. The method according to claim 11, wherein the mixture of carboxylic acids and/or derivatives thereof is a mixture of cannabinoids and/or derivatives thereof.

15. The method according to claim 11, wherein the mixture containing a metabolite of a polyunsaturated fatty acid is a mixture containing a metabolite of eicosapentaenoic acid and/or of docosahexaenoic acid and/or of docosapentaenoic acid.

16. The method according to claim 11, wherein the at least one pre-resolving mediator and/or the specialized pre-resolving mediator is derived from EPA, DHA or/and from DPA.

17. The method according to claim 11, wherein in the mixture containing at least one pre-resolving mediator and/or specialized pre-resolving mediator, the pre-resolving mediator is 18-HEPE, 17-HDHA and/or 14-HDHA, and the specialized pre-resolving mediator is lipoxins, resolvins, protectins and/or maresins.

18. The method according to claim 1, wherein the target component is a polyunsaturated fatty acid or is cannabidiol or tetrahydrocannabinol.

19. The method according to claim 18, wherein the target component is eicosapentaenoic acid and/or docosahexaenoic acid.

20. The method according to claim 1, wherein the target component is a metabolite of a polyunsaturated fatty acid or is a substance having the same composition as the metabolite.

21. The method according to claim 20, wherein the target component is a metabolite of eicosapentaenoic acid and/or of docosahexaenoic acid and/or of docosapentaenoic acid.

22. The method according to claim 1, wherein the target component is a pre-resolving mediator and/or at least one specialized pre-resolving mediator.

23. The method according to claim 22, wherein the target component is at least one of the group consisting of 18-HEPE, 17-HDHA, 14-HDHA, lipoxin, resolvin, protectin and maresin.

* * * * *